Feb. 2, 1960     T. A. MILLER ET AL     2,923,032
MOLD WITH SELF-TRIMMING PORTION
Filed April 8, 1955
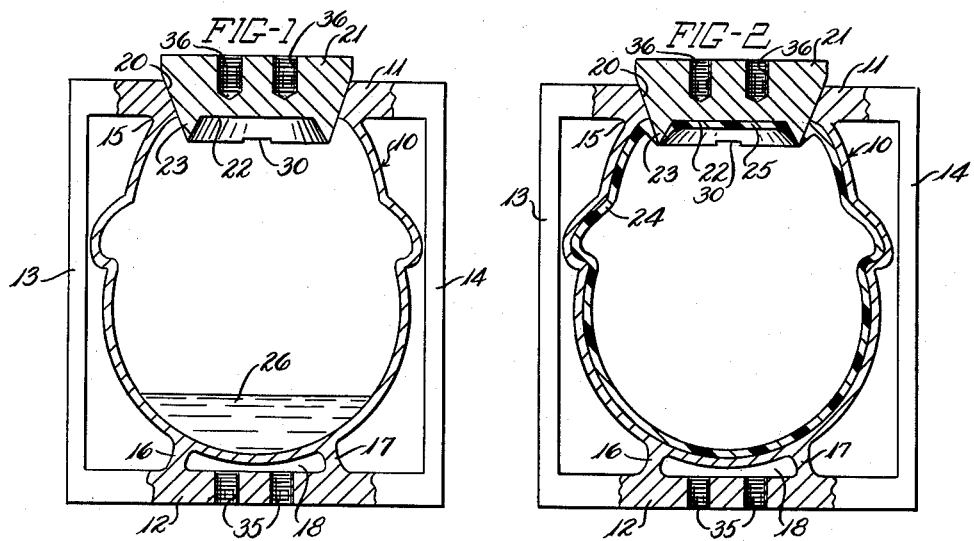
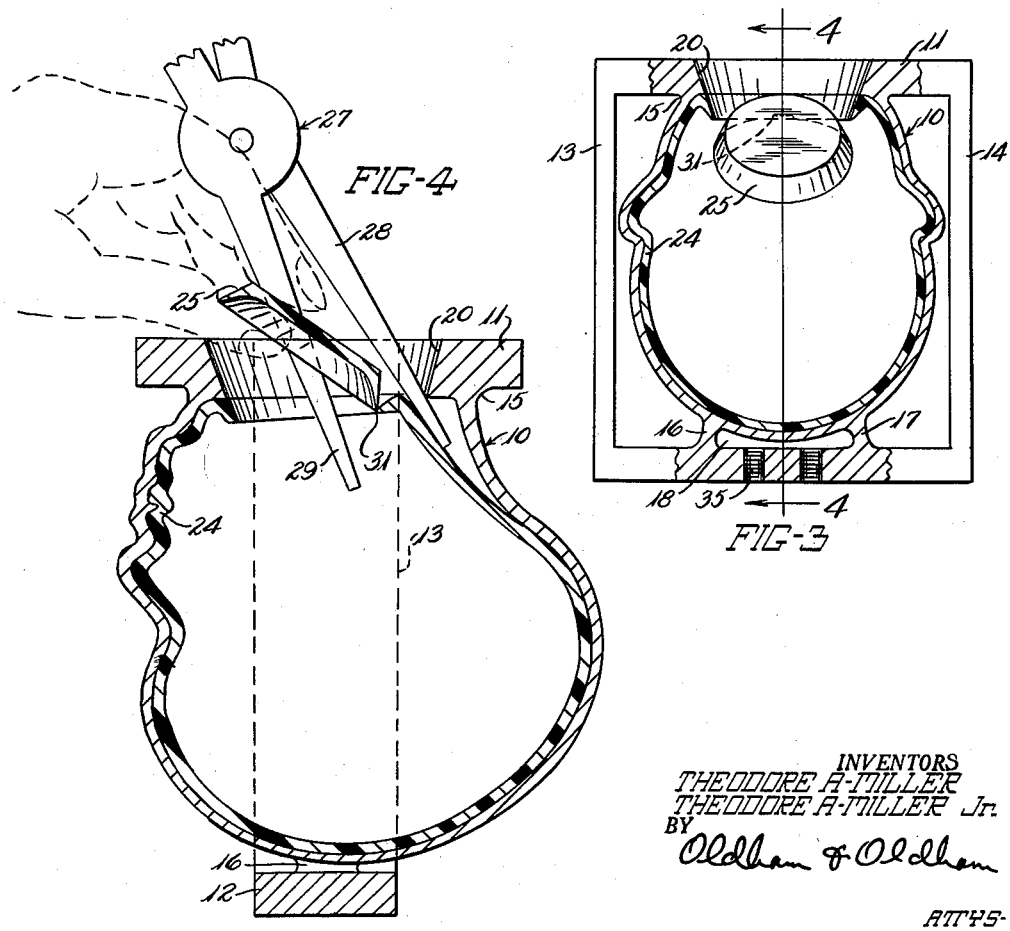
INVENTORS
THEODORE A. MILLER
THEODORE A. MILLER Jr.
BY
Oldham & Oldham
ATTYSns# United States Patent Office 2,923,032
Patented Feb. 2, 1960

2,923,032

MOLD WITH SELF-TRIMMING PORTION

Theodore A. Miller and Theodore A. Miller, Jr., Cuyahoga Falls, Ohio

Application April 8, 1955, Serial No. 500,180

4 Claims. (Cl. 18—39)

This invention relates to molds for forming hollow flexible plastic articles by deposit of material from a dispersion thereof sometimes known as plastisol, and is especially useful for separating the deposited material along a determinate line without use of trimming knives or shears.

In the manufacture of heads, bodies, legs and arms of dolls, hollow balls, toys and other hollow flexible articles, a dispersion of plastic material, or plastisol, is placed in a hollow mold cavity through an opening thereof. The mold is then closed and heat is applied thereto while the mold is rotated in different directions to coagulate and thermoset the material in a uniform layer about the interior face of the mold cavity. The mold is then cooled and the article is removed through the opening thereof.

As the material deposits in a layer of substantially uniform thickness over all interior surfaces of the mold including the closure for the opening thereof, it ordinarily requires cutting away the portion of the deposit which spans the opening before the article can be removed from the mold.

When the article is a doll head or other portion of a doll, the opening formed in the deposited article is at the neck and must be trimmed to provide an opening to be snapped over a shouldered neck of a doll body, and hand cutting of the head opening results in openings of non-uniform shape and size providing improper fits and loss of material and time.

It is an object of the present invention to provide a mold for this purpose having a self-trimming edge for accurately forming an opening in the hollow article.

Another object is to provide such a self-trimming edge which will provide a flap or hinge attaching a trimmed portion to the body of the article.

A further object is to provide a reinforced mold of the electro-deposited type having a self-trimming edge.

Still a further object is to facilitate removal of the article from the mold.

These and other objects will appear from the following description and the accompanying drawings.

Of the drawings:

Fig. 1 is a vertical cross sectional view of a doll head mold with the closure plug in place and a quantity of plastisol therein, the mold being shown in inverted position.

Fig. 2 is a similar view showing the material deposited and thermoset on the interior of the mold.

Fig. 3 is a similar view with the plug removed and the trim pieces separated from the body except at the hinge.

Fig. 4 shows a sectional view taken on line 4—4' of Fig. 3, with tongs being inserted to remove the article.

Referring to the drawings which illustrate an embodiment of the invention for illustrative purposes, the numeral 10 designates a hollow mold of thin walled construction of the type made by electro deposit of metal. Such a mold is low in compressive strength as compared to molds of the metal block type and for reinforcing it so that it may be mounted and clamped between spider plates, a reinforcing frame is provided thereabout and may consist of end plates 11 and 12 and bars 13 and 14 secured to the end plates as by welding. As the molds are subjected to rapid changes of temperature due to heating and cooling, the reinforcing frame should be made of non-corrosive metal which will not be annealed by such temperature changes. Phosphor bronze has been found satisfactory for the purpose. The mold 10, which in the example shown is a doll head mold, has a constricted neck which is secured to plate 11 about the neck by welding 15.

Plate 12 is preferably spaced from the mold 10 as are the bars 13 and 14 and the mold is secured to plate 12 at spaced intervals by welding 16, 17 providing spaces such as 18 therebetween for circulation of heating or cooling fluids, the bars 13, 14 being spaced from the mold 10 for the same reasons.

The assembled head mold 10 and frame are then machined to provide a conical neck opening 20 extending through the plate 11 and into the cavity of mold 10, the larger diameter being outermost of the mold cavity.

A closure plug 21 is provided to close the opening 20 and has a corresponding conical surface to fit therein.

To provide a self-trimming edge at the neck opening, the plug 21 extends inwardly of the mold 10 by an amount at least equal to the thickness of the desired article, and the inner face of the plug is formed with a recess 22, the wall 23 separating the recess 22 from the outer conical surface of the plug being formed as a sharp ridge which substantially divides the plastic material 24 deposited in the mold cavity from the material deposited in the recess 22, the deposits being united merely by a thin film over the ridge of the plug so as to be readily torn or separated along the ridge. When the mold is first closed, as shown in Fig. 1, a quantity of plastisol 26 has been placed in the mold. The ridge 23 will be seen to project well into the mold cavity. As the mold is rotated and heated, the plastisol is deposited over the interior thereof and is thermoset to provide the deposit 24, 25. Upon removal of the plug 21 the deposit 25 may be drawn outwardly by the plug and torn loose or it may remain attached to the deposit 24, but may be torn therefrom by forcing it inwardly of the cavity against the air enclosed in the cavity.

When as in the illustrated example, the mold is for a doll head and has a reentrant cavity, it becomes difficult to remove the article from the mold. In such a case it is advisable to employ pliers or tongs 27 and to insert one jaw 28 thereof between the wall of the article and the mold cavity and the other jaw 29 within the article and to clamp the jaws against the article, and then by a twisting of the tongs, winding the article about the jaws and withdrawing it. In starting such an operation, it is difficult to enter the jaw 28. In order to facilitate this, the trimming ridge 23 of the plug may be formed for a short distance preferably at the back of the neck opening of a doll head mold with a notch 30 so that at the notch, the height of the ridge is reduced and a resulting thickened connection between the deposits 24 and 25 is formed providing a flap or hinge 31. With this construction, the deposit 25 may be separated from the article deposit 24 entirely thereabout except at the hinge. The deposit 24 may then be grasped with one hand, as shown in Fig. 4 and employed to pull the adjacent wall of the deposit 24 from the mold face so as to facilitate entrance of the tongs. After removal of the article from the mold, the cutting at the hinge 31 to completely remove the piece 25 is readily accomplished.

Frame plate 12 is provided with tapped holes 35 whereby the mold cavity may be secured by screws to a supporting spider plate, and plug 21 is provided with tapped holes 36 whereby it may be secured to the opposite spider plate of a hinged mold support between which the molds may be clamped.

Doll heads produced in the described mold have a uniform neck opening for attachment to a doll body and require a minimum of hand trimming.

While the invention has been illustrated as applied to a doll head mold, the provision of a sharp edged ridge extending inwardly of a mold surface to divide the interior surface of a mold cavity where the article is formed by deposit, gelling and thermosetting of plastisol is useful in molds for other articles. It provides a self-trimming separation between adjacent deposits which are eventually to be separated.

These and other variations may be made without departing from the scope of the invention as it is defined by the following claims:

We claim:

1. A mold for forming plastic articles by deposit of material on the interior of a closed cavity from a dispersion of plastic material, said mold comprising a mold body having an interior cavity surface terminating in an opening of reduced size, and a cover for said opening having a sharp ridge of metal extending inwardly of said surface by an amount at least equal to the wall thickness of the desired deposit and substantially dividing the deposited material and providing self-trimming between the divided portions of the article, and a notch in said ridge for forming a hinge between the divided portions of the deposited material.

2. A mold for forming a hollow flexible plastic article by deposit of material from a dispersion thereof within the mold, said mold comprising a unitary hollow body having a single opening smaller than the cavity inwardly thereof, said opening being of conical form with outwardly flared walls, a removable closure member projecting into said mold from a wall of the mold, said member having a conical plug portion for seating in said opening and having at its end a recess facing inwardly of the mold and terminating in a sharp peripheral margin spaced inwardly from the face of the mold by a distance at least equal to the thickness of the desired deposit, for providing a self-trimming edge substantially separating portions of the deposit.

3. A mold for forming a hollow flexible plastic article by deposit of material from a dispersion thereof within the mold, said mold comprising a hollow body having a single opening of reduced size, and a plug adapted to close said opening, said plug having a recess in its surface opposed to said opening surrounded by a sharp edge periheral wall adapted to extend within the hollow interior of said hollow body to a distance at least equal to the deposited plastic for providing a self-trimming edge said hollow body and said plug having cooperating conical surfaces for engaging one another and limiting extension of said plug into said cavity.

4. A mold for forming a plastic article on the interior of a closed cavity to cover the entire interior thereof from a dispersion of plastic material, said mold comprising a mold body and a cover therefor, said body having an interior cavity surface terminating at an outwardly flared conical entrance of reduced size, said cover having a conical portion for seating in said entrance and extending into said cavity beyond said conical entrance in the closed condition of the mold, the portion of such cover extending inwardly beyond said entrance having a central cavity at least as deep as the extension beyond the entrance and terminating in a circumferential sharp margin at least as deep as the thickness of the desired article and substantially dividing the deposited material and providing a self-trimming area of a deposited article at the periphery of the entrance.

References Cited in the file of this patent

UNITED STATES PATENTS

| | | |
|---|---|---|
| 1,494,072 | Marshall | May 13, 1924 |
| 1,949,465 | Gammeter | Mar. 6, 1934 |
| 1,951,402 | Gammeter | Mar. 20, 1934 |
| 2,064,778 | Bateman | Dec. 15, 1936 |
| 2,455,248 | Hagen et al. | Nov. 30, 1948 |
| 2,588,571 | Porter | Mar. 11, 1952 |
| 2,730,765 | Crafton et al. | Jan. 17, 1956 |